3,287,067
WHEEL COVER
Arnold R. Brown, Birmingham, Mich., assignor to General Motors Corporation, Detroit, Mich., a corporation of Delaware
Filed Sept. 4, 1964. Ser. No. 394,528
4 Claims. (Cl. 301—37)

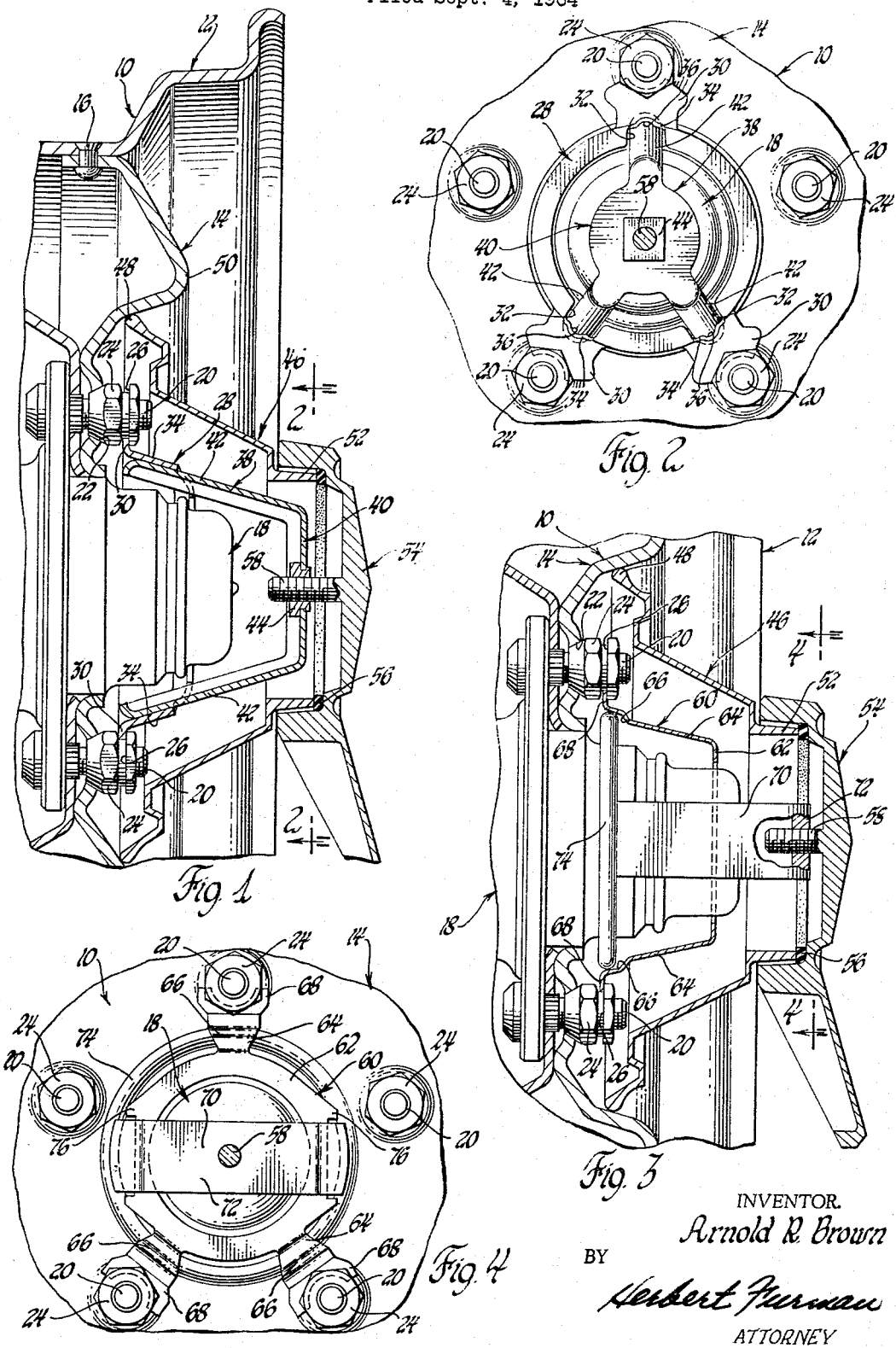

This invention relates to a wheel cover assembly and more particularly to a wheel cover assembly including a cover member and a spinner member adapted to be mounted on a vehicle wheel.

One feature of this invention is that it provides an improved wheel cover assembly including a support member adapted to be mounted on a vehicle wheel for movement axially thereof and a cover member and spinner member adapted to be mounted on the wheel upon rotary movement of the spinner member relative to the support member and axial movement of the support member relative to the wheel. Another feature of this invention is that rotary movement of the spinner member moves the support member axially outwardly of the wheel into engagement with locating means and moves the cover member into engagement with the wheel. A further feature of this invention is that the locating means includes a locating member mounted on the wheel bolts and the support member is slidable relative to the locating member into tight fitting engagement therewith.

These and other features of the wheel cover assembly of this invention will be readily apparent from the following specifications and drawings wherein:

FIGURE 1 is a partially broken away partial view of a vehicle wheel and wheel cover assembly according to this invention;

FIGURE 2 is a view taken generally along the plane indicated by line 2—2 of FIGURE 1;

FIGURE 3 is a partial view similar to FIGURE 1 and showing a modification; and

FIGURE 4 is a view taken generally along the plane indicated by line 4—4 of FIGURE 3.

Referring now to FIGURE 1 of the drawings, a vehicle wheel designated generally 10 includes a rim 12 and body 14 riveted or otherwise secured together at 16. The wheel 10 is of conventional construction and the details thereof form no part of this invention. The wheel 10 is secured to the axle assembly 18 of the vehicle by means of a number of studs 20 which are fixedly secured to the axle assembly 18 and extend through outwardly tapered or flaring openings 22 in the wheel body 14. Nuts 24 are threaded on the studs 20 to secure the wheel 10 in place and include a tapered portion received within the openings 22 of the wheel body. At least three of the nuts 24 further include an annular slot or groove 26 for a purpose to be described.

An annular mounting member of locating ring 28 includes three radially extending notched tabs 30 which are received within the grooves 26 of the three nuts 24 to thereby mount the ring on the wheel. The ring 28 further includes three slots 32 which are radially aligned with the tabs 30, with the material from the slots being bent radially outwardly therefrom to provide arcuate tabs 34. The tabs 34 are each provided with an intermediate reinforcing rib or groove 36 and it will be noted that the tabs extend generally radially inwardly and axially outwardly of the wheel 10.

A spider or support member 38 includes an annular body 40 provided with three axially inwardly and radially outwardly extending flanged arcuate legs 42, each of which is respective to a tab 34. The body 40 of the spider 38 fixedly mounts a nut 44.

A wheel cover or hub cap 46 may be of any desired cross sectional configuration and includes a peripheral margin 48 adapted to engage within the nose portion 50 of the wheel and an axially outwardly extending annular shouldered flange portion 52. A multi-armed cup shaped spinner 54 surrounds the portion 52 and is spaced therefrom by a gasket 56. The spinner 54 includes an integral stud 58 which is adapted to be threaded within the nut 44.

The mounting ring 28 and the spider 38 are first assembled to the wheel 10 and thereafter the cover 46 is fitted over the spider 38 in engagement with the nose portion 50 of the wheel. The spinner 54 is thereupon fitted over the flange 52 of the cover and the stud 58 threaded within the nut 44. Upon continued threading movement of the stud within the nut, the spider 38 is moved or shifted axially outwardly of the wheel 10 as the legs 42 slide relative to the tabs 34 until a tight interference fit is obtained between the tabs and these legs to securely retain to cover 46, the spinner 54 and the spider 38 in place on the wheel.

To remove the cover assembly from the wheel, the spinner 54 is rotated in the opposite direction until the stud 58 is moved out of threaded engagement with the nut 44.

Referring now to FIGURES 3 and 4 of the drawings, a modified form of the invention will be described and like numerals will be used for like parts. A mounting member 60 includes a body 62 provided with a circular opening to receive the axle hub cap. Three legs 64 extend axially inwardly and radially outwardly of the body 62 and include intermediate bent portions or pockets 66 and generally radially outwardly extending notched tabs 68 which are received within the grooves 26 of three of the wheel nuts 24. A generally U-shaped spider member 70 includes a tapped bight 72 and has the legs thereof welded or otherwise rigidly secured to an annular member or ring 74 which is received within the legs 64 of the member 60 and is adapted to be moved into engagement within the pockets 66 thereof. The body 62 of the member 60 further includes a pair of notched laterally extending portions 76, FIGURE 4, which guide axial movement of the member 70 relative to the member 60. when the spinner 54 is rotated to thread the stud 58 into the bight 72, the member 70 is shifted axially outwardly of the wheel to move the ring 74 into tight engagement with the pockets 66.

Thus, this invention provides an improved wheel cover assembly.

I claim:

1. In combination with a vehicle wheel an annular mounting member mounted on said wheel and including a plurality of annularly spaced abutments located in axially outwardly spaced relationship to said wheel, a support member including a plurality of annularly spaced portions normally located in axially inwardly spaced relationship to said abutments, means interconnecting said members and locating said portions in axial alignment with said abutments, a wheel cover including a portion engageable with a portion of a vehicle wheel to axially locate said cover relative to said wheel, and means mounted on said cover and operatively connected to said support member to move said support member axially outwardly of said mounting member to move said portions thereof into engagement with said mounting member abutments and locate said cover on said wheel.

2. The combination recited in claim 1 wherein said abutments extend axially outwardly and radially inwardly of said wheel and said portions of said support member extend axially inwardly and radially outwardly of said wheel, said interconnecting means including interfitting portions on said mounting member and said support member.

3. The combination recited in claim 1 wherein said cover mounted means includes a spinner member rotatably mounted on said cover and means interconnecting said spinner member and said support member to move said support member axially outwardly of said wheel upon rotary movement of the spinner member.

4. The combination recited in claim 1 wherein said abutments include a plurality of axially outwardly and radially inwardly extending arcurate members, said portions include a plurality of axially inwardly and radially outwardly arcuate members complementary to and slidably engageable with said first mentioned arcuate members to permit relative axial movement between said mounting and support members and locate said members against radial movement relative to each other.

References Cited by the Examiner

UNITED STATES PATENTS

| 2,722,822 | 11/1955 | Thomas. | |
| 2,935,360 | 5/1960 | Lyon | 301—37 |
| 2,963,323 | 12/1960 | Lyon | 301—37 |
| 2,995,402 | 8/1961 | Lyon | 301—37 |
| 3,202,460 | 8/1965 | Holbrow | 301—37 |

FOREIGN PATENTS

| 492,840 | 9/1938 | Great Britain. |
| 250,011 | 9/1926 | Italy. |

BENJAMIN HERSH, *Primary Examiner.*

R. J. JOHNSON, *Assistant Examiner.*